Oct. 8, 1963 G. W. BOYER 3,106,361

APPARATUS FOR SUPPORTING TAPE

Filed Feb. 1, 1960 2 Sheets-Sheet 1

APPARATUS FOR SUPPORTING TAPE

Filed Feb. 1, 1960

INVENTOR.
GEORGE WESLEY BOYER
BY
Christie, Parker & Hale
ATTORNEYS.

United States Patent Office 3,106,361
Patented Oct. 8, 1963

3,106,361

APPARATUS FOR SUPPORTING TAPE

George Wesley Boyer, Covina, Calif., assignor to Consolidated Electrodynamics Corporation, Pasadena, Calif., a corporation of California Filed Feb. 1, 1960, Ser. No. 6,022
2 Claims. (Cl. 242—68)

This invention relates to tape transport systems and consists of an improvement in the storage and guidance of the tape.

The use of magnetic tapes to record information is well-known. In conventional systems the tape transport system consists of two rotatable hubs, each containing a reel adapted to hold the magnetic tape. The tape is unwound from one reel and passed adjacent a magnetic transducer for either reading or recording information on the tape. The tape is then wound on the other reel by various conventional means which provide for the rotation of the hub to which the reel is attached. In such conventional systems, the space required to contain the two reels is appreciable, since the reels ordinarily are contained in the same plane. Only one-half of the storage capacity of the reels is utilized in such conventional systems at any one instant.

In order to provide for the rapid recording or reading of digital information in particular, the tape is passed adjacent the magnetic transducer at a comparatively high rate of speed. Utilizing a high rate of speed enables a large number of information bits to be recorded or read in a comparatively short period of time. The magnetic tape used in such systems is not of a uniform width, but varies slightly in width about a nominal width. For example, magnetic tape which is nominally one inch in width has a standard width deviation of +0, —.004 inches. In conventional systems, as the tape is passed adjacent the magnetic transducer, the tape may be slightly skewed either upwards or downwards from a path perpendicular to the magnetic transducer due to these width variations. The binary bits comprising a word are recorded as magnetized spots across the width of the magnetic tape in one system of recording. In order to insure that all bits in the same word are read simultaneously and only a single word is read at a single instant, the length of a magnetized section on the tape corresponding to a bit is made comparatively long. Therefore, even though the tape may pass the transducer in a skewed position, the length of the bit and the separation between words serially recorded on the tape compensates for the skewing. However, this procedure, which necessitates a high tape transport speed in order to process a large quantity of information in a short period of time, requires that a large quantity of tape be utilized in conjunction with a comparatively small amount of information.

In certain applications for tape transport mechanisms, for example in airborne utilizations, space is at a premium. Therefore, it is necessary in conventional practice, in order to provide a sufficient amount of magnetic tape to process the information required, to utilize a low tape transport speed, short bit length and narrow word spacing. These processes result ordinarily in unsatisfactory performance of the mechanism, due to the skewing of the tape.

According to the present invention a novel method of storing tape in the transport mechanism is utilized to greatly increase the total length of tape available in a given space. A novel guidance system is utilized to greatly reduce the skew of the tape as it passes the magnetic transducer. By utilizing the novel tape storage and guidance mechanism, greatly increased information storage capacity is achieved for a given length of tape, as compared to conventional practice.

The first feature of the invention, the novel tape storage apparatus, eliminates the conventional practice of utilizing two reels to store the tape. As can be readily seen, if two reels are utilized and the tape, when stored on a single reel, extends to the reel outer perimeter, the space required to store the tape before and after use is the sum of the spaces required to hold the two reels. By the elimination of the reels and the substitution therefor of hubs and axially rotatable tapered rollers, the tape being wound on one hub is allowed to encroach upon the space formerly occupied by the tape being unwound from the other hub. Thus, an appreciable saving in the space required to store the tape is achieved.

In order to eliminate the major portion of the skew of the tape when passing the magnetic transducer, a long guidance track is utilized to enclose the edges of the tape. This long guidance track averages out the irregularities in tape width as the tape passes adjacent the transducer. The long guidance track consists of two parallel guide plates connected together by a series of posts. The posts are disposed so as to form two intersecting arcs, the point of intersection being adjacent the magnetic transducer. The arcuate configuration is utilized to maintain continuous contact between the posts and the tape. This contact insures that the tape irregularities are averaged out by the parallel guide plates.

The invention may be more readily understood by referring to the accompanying drawings in which.

Figure 1:
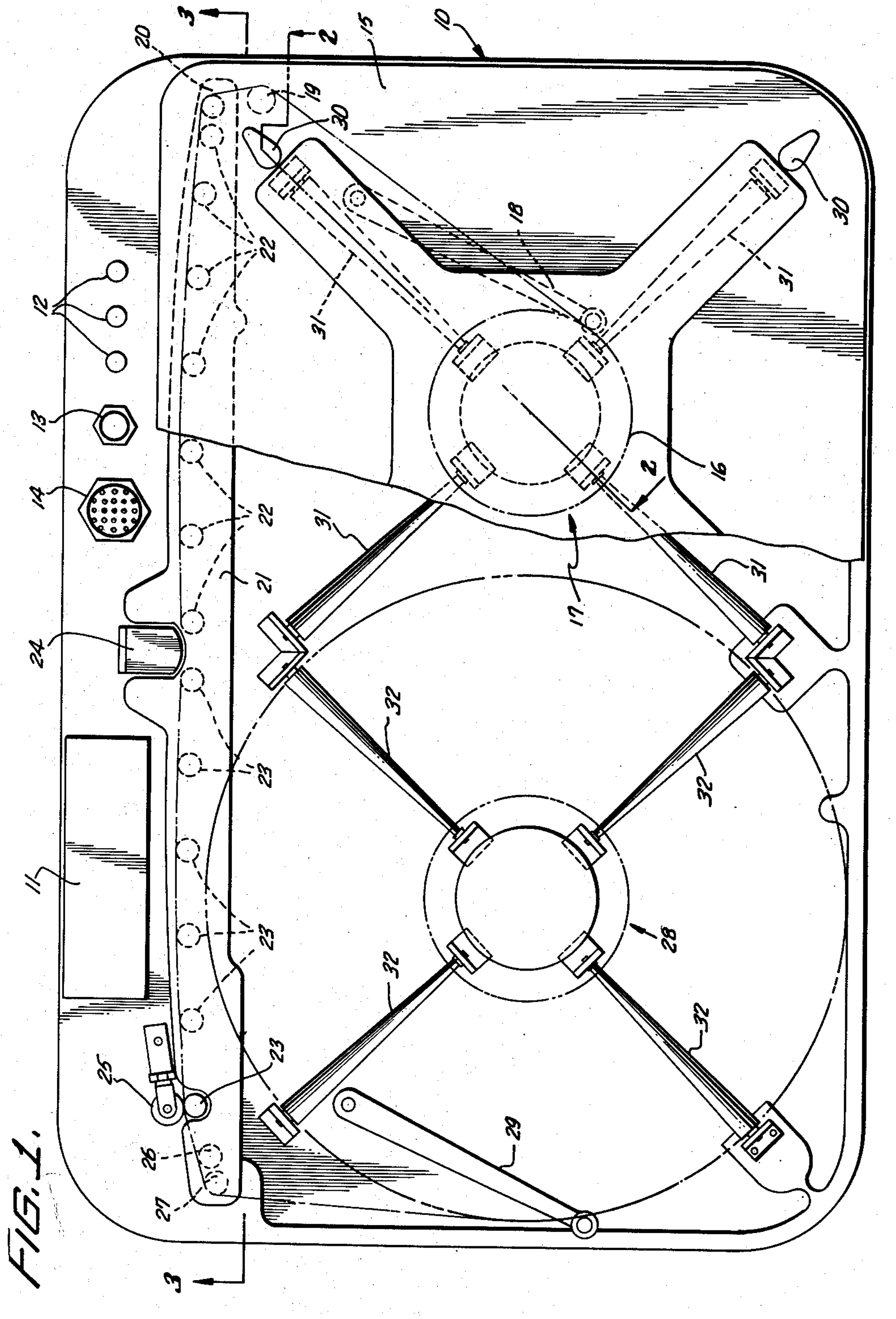
FIGURE 1 is a plan view, partially in section, of a tape transport mechanism utilizing the invention.

Referring now to FIG. 1 there is shown a tape recorder 10. The tape recorder 10 has a control panel 11, three indicator lights 12, a signal input terminal 13 and a remote control terminal 14. The tape recorder 10 has a top cover 15 which is partially broken away in FIG. 1.

Magnetic tape, indicated by the dotted line 16, is contained on a first hub 17. A pivoted arm 18 rides against the tape 16 about the hub 17 so as to retain the tape in position. The tape 16 is threaded past a guide roller 19 and a metering roller 20. The metering roller 20 is positioned between two parallel plates 21, only one of which is shown in FIG. 1.

A first group of posts 22 is positioned between the parallel guide plates 21 in the form of an arc. A second group of posts 23 is also positioned between the parallel guide plates 21 in the form of an arc. These two arcs intersect at a magnetic transducer 24. A pinch roller 25 rides against the tape 16 at one of the posts 23 to provide the necessary tension on the tape 16 as it is transported. After passing the pinch roller 25, the tape 16 passes a take-off guide post 26 and take-off roller 27 positioned between the parallel plates 21. The tape 16 is then wound on to a second hub 28. A pivoted guide arm 29 maintains the level position of the tape as it is wound on the hub 28.

The cover 15 is held in position on the tape recorder 10 by means of snap lock fittings 30, only two of which are shown in FIG. 1.

Four pairs of tapered rollers 31, only one roller of a pair being shown in FIG. 1, are disposed about the first hub 17 so as to extend radially therefrom. Four pairs of tapered rollers 32 are similarly disposed about the second hub 28. The tapered rollers 31 and 32 are frusto-conical in configuration and are positioned so that the adjacent surfaces of the pairs of rollers lie in two parallel planes perpendicular to the hub associated therewith.

Figure 2:
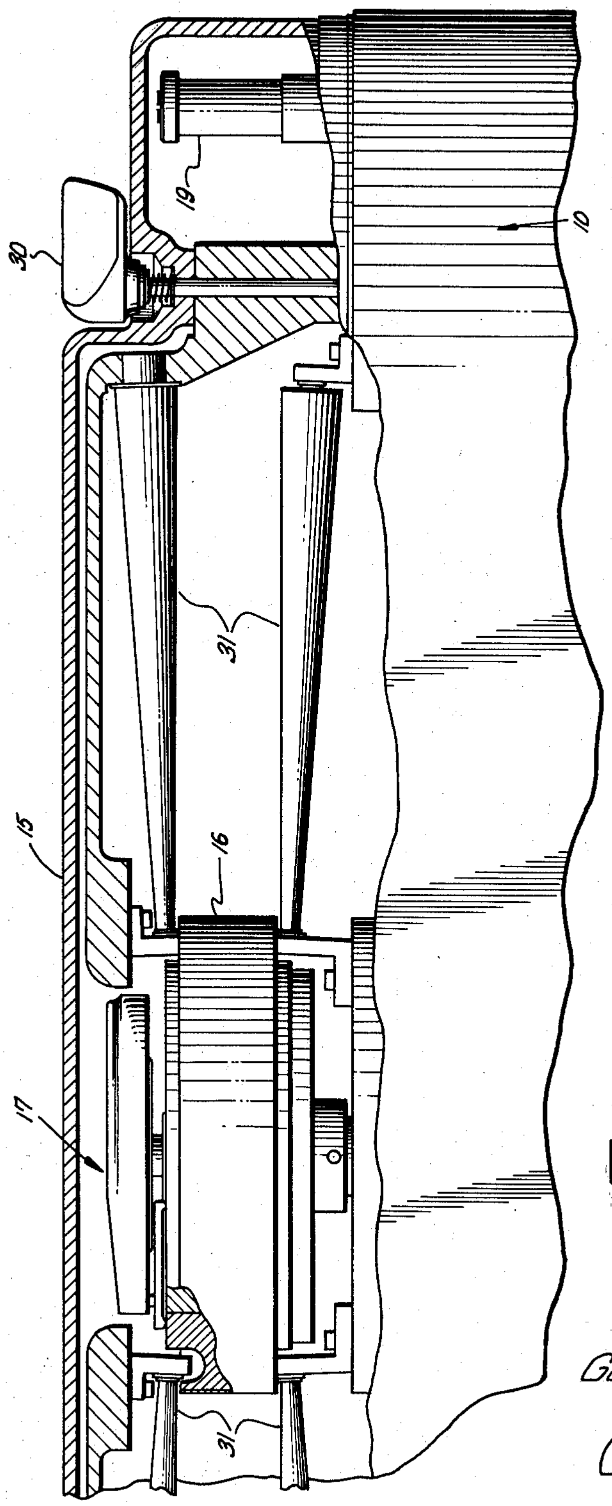
FIGURE 2 is a partial elevation of the tape transport mechanism taken along the cutting line 2—2 of FIG. 1, showing the tapered rollers in detail.

FIGURE 2 illustrates in detail the disposition of the rollers 31 with respect to the hub 17 and tape 16. The rollers 32 are similarly disposed with respect to the hub 28. The rollers 31 are held by conventional ball bearing means so as to be fixed in location and are freely rotatable about their longitudinal axes. Since the adjacent surfaces of a pair of rollers are parallel, the distance between the adjacent surfaces of the two rollers in a pair is constant. This positioning necessitates that the longitudinal axis of rotation of a roller be positioned at an angle to the tape. By utilizing tapered rollers disposed as just described, the angular velocity of points on a rotating roller surface increases in proportion to the distance of the surface point from the hub.

By selecting the locus of the intersection of the longitudinal axes of the tapered rollers on one side of a hub, the tensioning effect which the rollers exert on the tape being wound on the hub can be controlled. For example, if the locus of the intersection of the axis is a point on the axis of rotation of the hub, the rollers will exert a neutral tensioning effect on the tape being wound on the hub. In other words, the angular velocities of any point on the roller and the adjacent tape being wound on the hub are equal when the angular velocity of any one point on the tapered roller and the adjacent tape are equal. Rotation of the rollers occurs when the tape being wound about the hub physically contacts the rollers.

In certain applications, it may be desirable to either augment or diminish the tension with which the tape is being wound on the hub. With rollers disposed as just described, tension can be diminished by increasing the amount of taper of the rollers, or by moving rollers, tapering as previously described, away from the axis of rotation of the hub. Similarly, tension may be augmented by decreasing the amount of taper of the rollers, or by moving rollers, tapering as previously described toward the axis of rotation of the hub. In all cases, the parallel alignment of the adjacent surfaces of a pair of rollers is retained.

Figure 3:
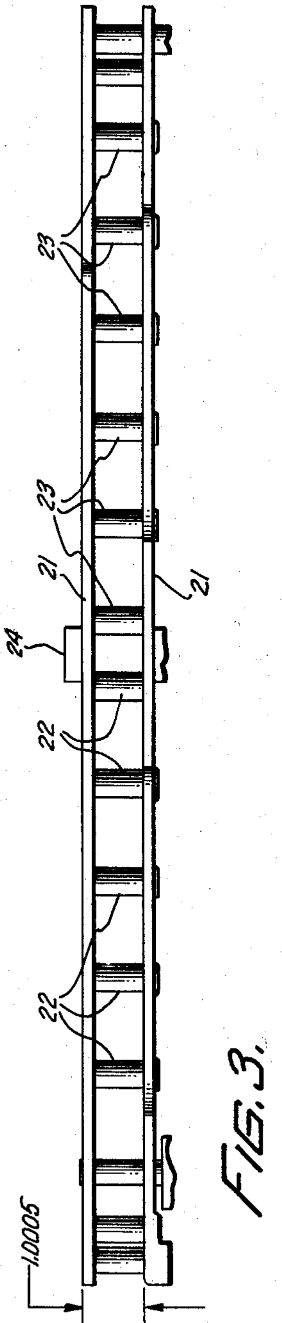
FIGURE 3 is an elevation of the tape guidance system taken along the cutting line 3—3 of FIG. 1.

FIGURE 3 is an elevation of a tape guidance system according to the invention. The pair of guidance plates 21 are spaced apart by the arcuately disposed first series of posts 22 and second series of posts 23. The magnetic transducer 24 is positioned adjacent the intersection of the two arcs. The spacing between the two plates is dependent upon the width of the magnetic tape to be guided and the width tolerance of the tape. The two plates 21 should be spaced sufficiently far apart that the tape will pass freely therebetween. However, the spacing should not be such as to permit merely lateral movement of the tape. For example, in guiding the previously described tape of nominal one inch width, appropriate spacing between the two plates 21 is 1.005 inches, −0, +.0003.

The length over which the tape is to be guided is primarily dependent upon the permissible skew for the particular system, assuming the guide plates have been disposed as just described. In the practice of the invention the minimum length over which the tape must be guided is equal to one-half of the quotient of the width deviation of the tape divided by the maximum permissible skew. This is the minimum tape guidance or travel length necessary, and in practice it is preferable to provide for a somewhat greater length of guidance. For example, when using the one inch tape already referred to, if it is desired to maintain a maximum skew of one hundred microinches, the minimum tape guidance length is 20 inches. However, in practice it is preferable to make this tape guidance length at least 25 inches.

In such a system the support posts 22 and 23 are preferably disposed in arcs of circles whose radii are at least twice as great as the tape guidance length. For example, in the system just described for guiding one inch tape, the disposition of the posts 22 and the posts 23, each, in an arc of a circle of one hundred inch radius provides for satisfactory guidance contact between the support posts and the tape while not introducing so great a curvature of the support posts alignment as to appropriate space therefor unnecessarily.

The essence of the invention in the tape guidance system lies in the use of the extremely long guidance track to reduce the skewing of the tape adjacent the magnetic transducer. For certain applications or tolerances of tape, modifications of these design equations may be found to be advantageous. It is to be understood that these design equations embody the concept of the invention and are intended to be primarily a guide in the practice thereof, rather than to constitute an unnecessary limitation.

I claim:

1. Apparatus for supporting tape wound about a rotatable hub comprising a plurality of pairs of frustoconical rollers radially disposed about the hub, the rollers in a pair of rollers being disposed on opposite sides of the hub, and holding and positioning means for holding the rollers so that each roller is freely rotatable about its longitudinal axis and for positioning the rollers so that adjacent surfaces of the pairs of rollers lie in two parallel planes perpendicular to the hub associated therewith and the longitudinal axes converge toward the axis of rotation of the hub.

2. Apparatus for supporting tape wound about a rotatable hub comprising a plurality of pairs of frustoconical rollers disposed about the hub, one roller of a pair being positioned on either side thereof so as to extend radially therefrom, and means for holding the rollers, whereby each roller is freely rotatable about its longitudinal axis, and for positioning the rollers with respect to each other and the hub, so that adjacent surfaces of the pairs of rollers lie in two parallel planes perpendicular to the hub associated therewith and the longitudinal axes of rotation of all of the rollers on one side of the hub converge at a point which is on the axis of rotation of the hub.

References Cited in the file of this patent

UNITED STATES PATENTS

| | | |
|---|---|---|
| 613,956 | Anderson | Nov. 8, 1898 |
| 1,823,245 | Wittel | Sept. 15, 1931 |
| 2,020,521 | Scott | Nov. 12, 1935 |
| 2,273,274 | Krouse | Feb. 17, 1942 |
| 2,355,594 | Kuhlik | Aug. 8, 1944 |
| 2,398,639 | Heyer | Apr. 16, 1946 |
| 2,676,766 | Ross et al. | Apr. 27, 1954 |
| 2,706,629 | Caillot | Apr. 19, 1955 |
| 2,894,702 | Heath et al. | July 14, 1959 |
| 2,940,753 | Nygaard | June 14, 1960 |